April 28, 1953

N. B. PLATT 2,636,416

STEREOSCOPIC PLOTTER

Filed Dec. 29, 1950

INVENTOR.
Norman B. Platt,
BY Victor J. Evans & Co.
ATTORNEYS

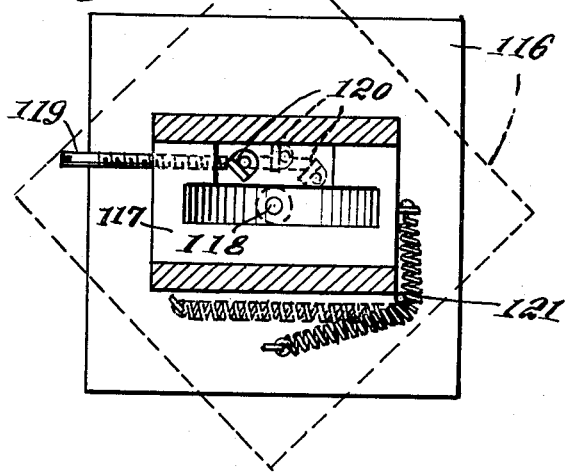

Patented Apr. 28, 1953

2,636,416

UNITED STATES PATENT OFFICE 2,636,416

STEREOSCOPIC PLOTTER

Norman B. Platt, Grand Junction, Colo.

Application December 29, 1950, Serial No. 203,469

3 Claims. (Cl. 88—29)

This invention relates to topography, and more particularly to an apparatus for producing accurate maps from aerial photographs.

The object of the invention is to provide an apparatus which includes a pair of adjustable tables, each supporting an aerial photograph of terrain, there being a movable tracing instrument for recording on a map all points having the same elevation.

Another object of the invention is to provide an apparatus whereby, by the simultaneous use of both eyes of the operator, details can be accurately transferred from a pair of aerial photographs to the map being made.

Still another object of the invention is to provide a map-making apparatus wherein the tables which support the aerial photographs can be tipped or adjusted in order to provide for parallax adjustment, the parts of the apparatus being adjustable whereby a parallax free virtual model is produced, the apparatus enabling the operator to draw planimetric details in their true positions.

Another object of the invention is to provide a map-making apparatus which is relatively inexpensive to manufacture.

Other objects and advantages will be apparent during the course of the following description.

In the accompanying drawings forming a part of this application, in which like numerals are used to designate like parts throughout the same:

Figure 5 is a side elevational view of the combination tracing instrument and light source;

Figure 6 is a sectional view taken on the line 6—6 of Figure 5;

Figure 7 is a top plan view of the assembly of Figure 5;

Figure 8 is a vertical sectional view taken through the combination tracing instrument and light source;

Figure 9 is a sectional view taken on the line 9—9 of Figure 5;

Figure 10 is a sectional view taken on the line 10—10 of Figure 2;

Figure 11 is a sectional view taken on the line 11—11 of Figure 2;

Figure 12 is a sectional view taken on the line 12—12 of Figure 11;

Figure 13 is a sectional view taken on the line 13—13 of Figure 12;

Figure 14 is a face view of one of the mounting means for the eye piece mirrors;

Figure 15 is a sectional view taken on the line 15—15 of Figure 14;

Figure 16 is a sectional view taken on the line 16—16 of Figure 14;

Figure 17 is a longitudinal sectional view taken through the eye piece mounting and showing parts in section and certain parts separated for clarity;

Figure 18 is an elevational view of one of the body pieces;

Figure 19 is an elevational view of one of the support pieces;

Figure 20 is an elevational view of one of the mirror-holding pieces;

Figure 21 is a sectional view taken on the line 21—21 of Figure 14.

Figure 1:
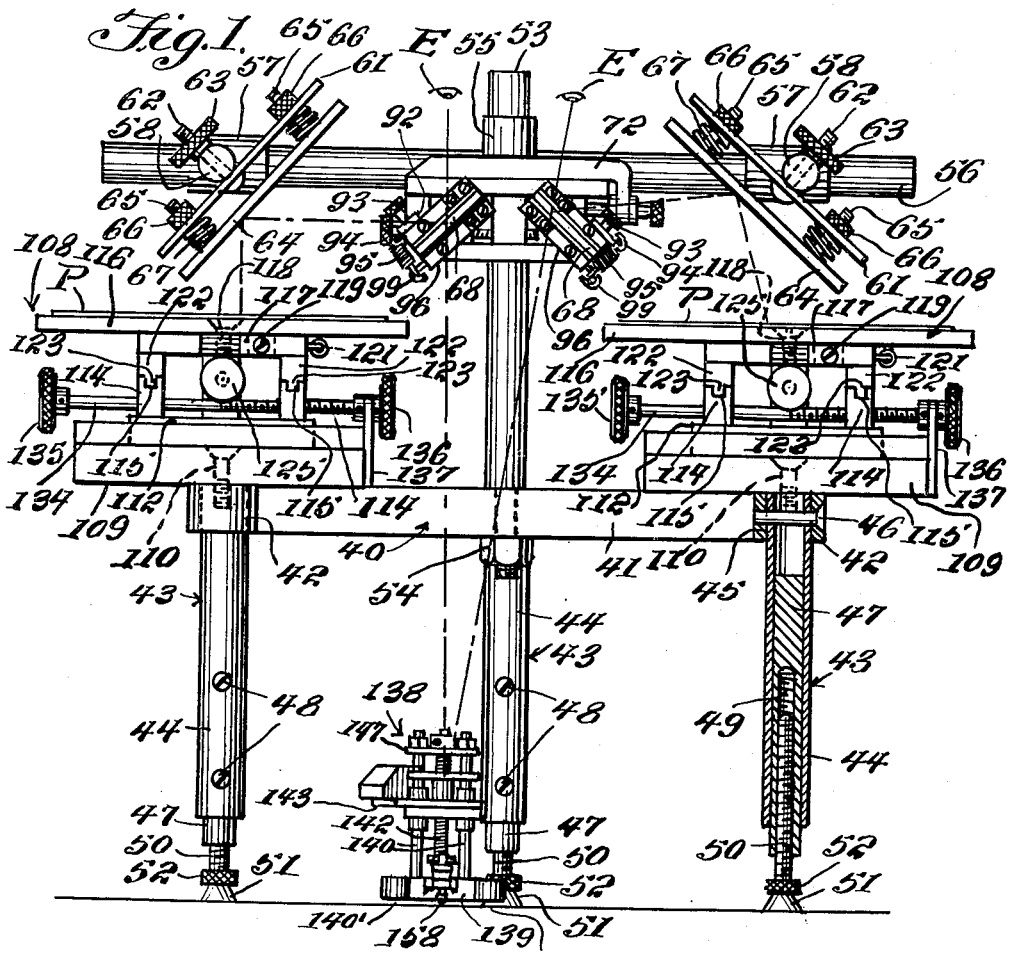
Figure 1 is a front elevational view of the map-making apparatus constructed according to the present invention, with parts broken away and in section.
Figure 2:
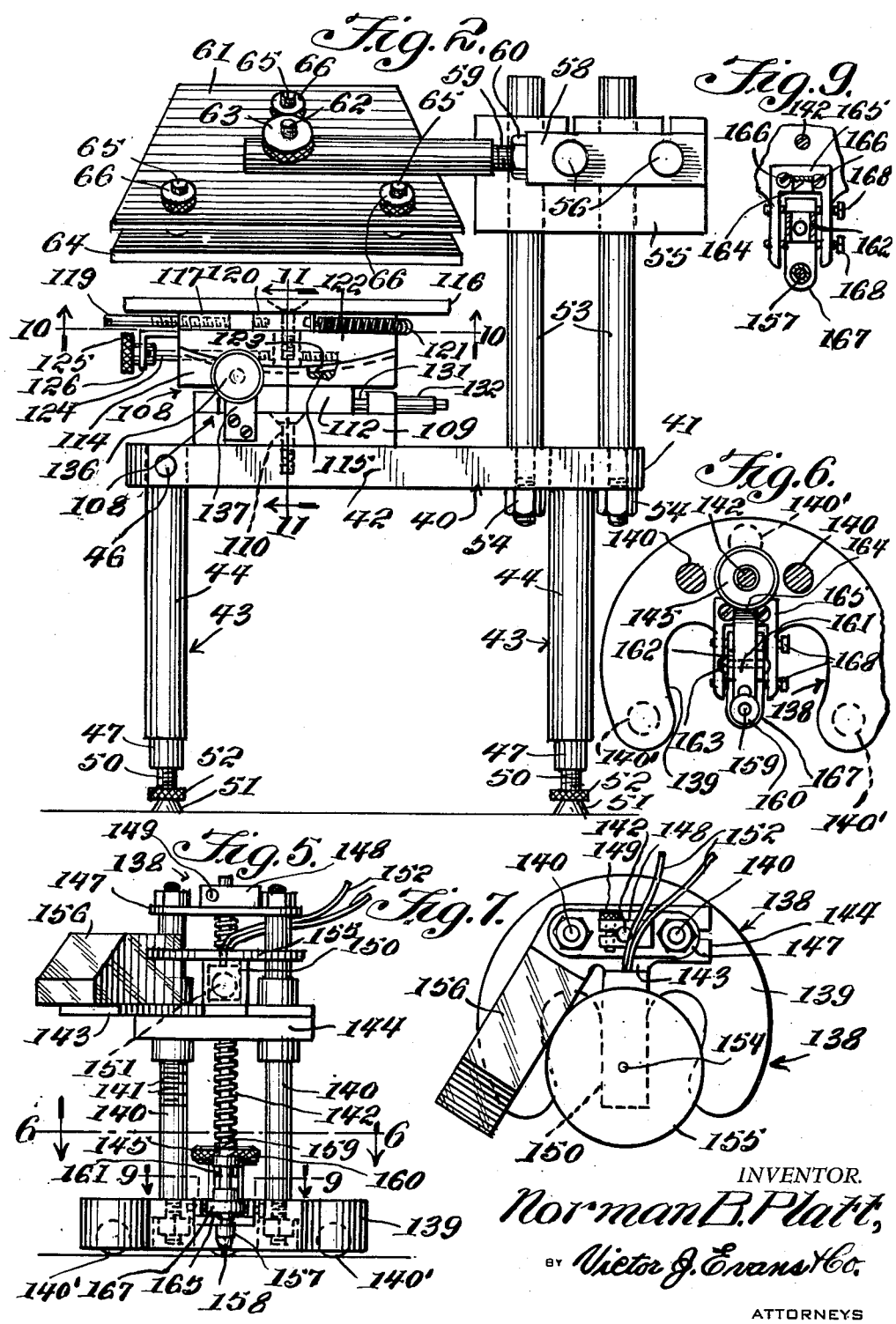
Figure 2 is an end elevational view of the apparatus of the present invention.
Figure 4:
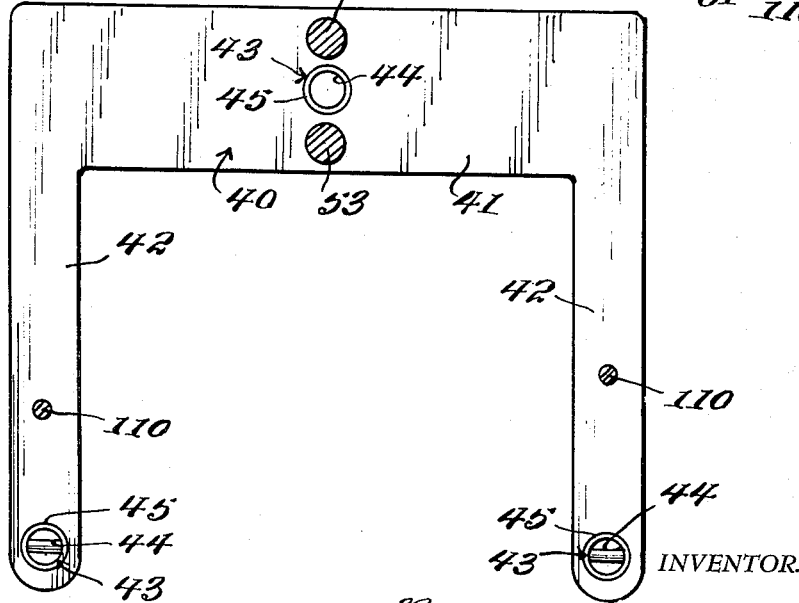
Figure 4 is a horizontal sectional view taken through the apparatus and looking down on the table.

Referring in detail to the drawings, the numeral 40 designates a horizontally disposed table which includes a web 41, Figures 1 and 4, and extending from the web 41 is a pair of spaced, parallel arms 42. For supporting the table 40, a plurality of vertically disposed, spaced, parallel leg assemblies 43 are provided. Each of the leg assemblies 43 includes a hollow stem 44 that has its upper end extending through an opening 45 in the table 40, and the upper end of the sleeve 44 is secured to the table by suitable securing elements, such as rivets 46.

Adjustably mounted in each of the sleeves 44 is an elongated bushing 47, the bushing 47 being maintained immobile in its various adjusted positions within the sleeve 44 by suitable set screws 48, Figure 1. The bushing 47 is provided with an interiorly threaded socket 49, and arranged in engagement with the socket 49 is an exteriorly threaded stem 50. A knurled knob 52 is secured to the stem 50 adjacent its lower end for rotating the latter, and a foot 51 is secured to the bottom of the stem 50 for engaging the floor or other surface. Thus, by adjusting or rotating the knob 52, or by adjusting the position of the bushing 47, the height of the leg assemblies 43 can be adjusted or varied as desired.

Figure 3:
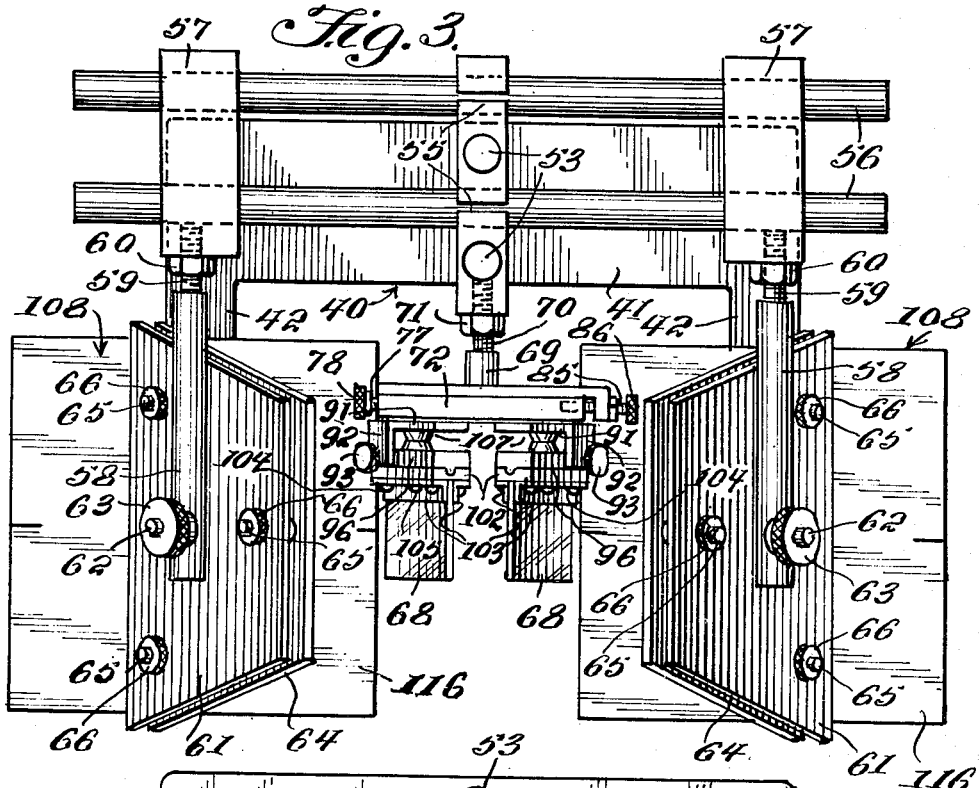
Figure 3 is a top plan view of the apparatus of the present invention.

Extending upwardly from the web 41 and secured thereto is a pair of spaced, parallel, vertically disposed standards 53, Figure 3. The lower ends of the standards 53 are maintained connected to the web 41 of the table 40 by suitable nuts 54, Figure 1. Mounted on the upper ends of the pair of standards 53 are clamps 55, and a pair of horizontally disposed, spaced, parallel, cylindrical bars 56 are supported by the clamps 55. The bars 56 serve to support a pair of spaced brackets 57.

Extending forwardly from each of the brackets 57 is a horizontally disposed post 58, each of the posts 58 being provided with a threaded end 59 which is arranged in threaded engagement with the bracket 57. A suitable nut 60 is arranged in engagement with the threaded end 59, whereby the posts 58 can be adjusted or rotated. A stereoscopic mirror is connected to each of the posts 58. Thus, the numeral 61 designates a plate which is connected to the post 58 by a suitable bolt 62, Figure 1, and a knurled knob or nut 63 is arranged in engagement with the bolt 62 for maintaining these parts in assembled relation. Arranged in spaced relation below each of the plates 61 is a body mirror 64. A plurality of spaced, parallel bolts 65 serve to connect the mirror 64 to the plates 61, and a knurled knob 66 serves to maintain these parts in adjusted or assembled relation. A coil spring 67 is circumposed upon each of the bolts 65 between the plates 61 and the mirror 64. By rotating or turning the knob 66, a very accurate adjustment of the mirror 64 can be effected or accomplished.

A means is provided for adjustably supporting a pair of transparent eye piece mirrors 68 on the machine. This means comprises a stub shaft 69 which has a threaded end 70 arranged in threaded engagement with the front end of the clamp 55. An adjusting nut 71 is arranged in engagement with the threaded end 70, Figure 3, and secured to the front end of the stub shaft 69 is a body member 72, Figure 21. The body member 72 is provided with a cutout or trackway 73 for a purpose to be later described. Slidably or adjustably mounted in the trackway 73 are three blocks 74, 75 and 76, Figures 14, 15, 16 and 17. The block 74 serves as a support for one of the eye piece mirrors 68, while the block 76 serves as a support for the other eye piece mirror 68. A means is provided for causing movement of the pair of blocks 74 and 76 toward and away from each other to thereby move the eye piece mirrors 68 toward and away from each other. This means comprises a screw member 77 which has a knurled knob 78 thereon for rotating the screw member 77, Figure 16. The screw member 77 includes a threaded portion 79 which is arranged in engagement with the threaded bore 80 that is formed in the block 74, and the screw member 77 further includes a second threaded portion 81 which has threads that extend in the opposite direction from the threads on the portion 79. The threaded portion 81 is arranged in threaded engagement with a threaded bore 82 that is formed in the block 76. Thus, by rotating the screw member 77, the blocks 74 will be moved toward and away from each other. The screw member 77 further includes a smooth portion 83 which extends rotatably through a smooth bore 84 in the block 75.

A means is provided for causing movement of the pair of eye piece mirrors 68 from one side to the other simultaneously. This last-named means comprises a screw member 85 which has a knurled rotating knob 86 mounted on one end thereof. The screw member 85 includes a smooth portion 87 that rotatably projects through a smooth bore 88 in the block 76, and the screw member 85 further includes a threaded portion 89 that is arranged in threaded engagement with a threaded bore 90 in the block 75. By rotating the screw member 85 by means of the knob 86, the block 75 can be shifted along the trackway 73, and this in turn will result in or cause both of the blocks 74 and 76 to move in the same direction at the same time, so that the eye piece mirrors 68 will have corresponding movements.

The mounting for the eye piece mirrors 68 further includes a body piece 91 which has a flange 92 secured thereto, there being an adjusting screw 93 extending through the flange 92. A hook 94 projects from the flange 92, and a coil spring 95 is adapted to have one end connected to the hook 94 and the other end connected to a support piece 96, Figure 19. A stem 97 projects through the body piece 91, Figure 17, and into engagement with a conically-shaped seat 98 so as to insure that the parts are properly centered. Projecting from the support piece 96 is a rib 100, and the rib 100 is adapted to seat in a longitudinally extending recess or groove 101, the groove 101 being formed in the rear surface of the mirror-holding piece 102. A hook 99 extends from the support piece 96, and the other end of the coil spring 95 is adapted to be connected to the hook 99. The coil spring 95 serves to maintain the pieces 91 and 96 connected together. A pair of spaced angle irons 103 are secured to the piece 102 by suitable securing elements, such as screws 104, Figure 20, and the eye piece mirror 68 is frictionally held between the pair of angle irons 103. Suitable screws 105 extend through the piece 102 and into engagement with the piece 96 for maintaining the pieces 96 and 102 connected together. Suitable securing elements, such as screws 107, are provided for attaching the body pieces 91 to the blocks 74 and 76.

Supported by each of the arms 42 is a table assembly 108. The table assemblies 108 are identical, so that a description of one will suffice for both. The table assemblies 108 are adapted to each support an aerial photograph P, Figure 1, thereon. Each of the table assemblies 108 includes a horizontally disposed shelf 109 which is secured to the arms 42 by a screw 110, Figure 11, and the shelves 109 are each provided with a track 111. A base 112 is slidably or adjustably mounted in each of the tracks 111. Projecting upwardly from the base 112 is a pair of spaced, parallel, vertically disposed side walls 114 which are each provided with an arcuate track 115 for a purpose to be later described. Arranged above the base 112 is a table top 116 upon which the photo is supported, and carried by the table tops 116 is a center piece 117. A pin or rivet 118 provides a pivotal connection whereby the table top 115 can pivot about a vertical axis. A manually operable means is provided for causing pivotal movement of the tale tops 116 about an axis extending through the pin 118, and this means comprises a screw member 119, Figure 10. The inner end of the screw member 119 abuts or contacts the lug 120, the lug 120 being operatively connected to the table top. A coil spring 121 serve to normally urge the table top 116 in a direction so that the lug 120 contacts the inner end of the screw member 119, whereby upon proper rotation of the screw member 119, the table top 116 can be pivoted.

A means is provided for tilting or rocking the table top 116, as shown in Figure 12, so that the table top 116 can be tilted about a horizontal axis or move from the solid line position shown in Figure 12 to the broken line position, and vice versa. This means comprises a pair of spaced, parallel, vertically disposed side pieces 122, Figure 11, and the side pieces 122 depend from the bottoms of the table tops 116. The lower surface of each of the side pieces 122 is shaped to define a tongue 123 which is arcuate and the tongue 123 rides in or engages in the trackways 115 which are formed in the upper surfaces of the side walls 114. For manually causing the tilting of the table top 116, a screw member 124 extends through a bracket 126 which depends from the table top 116. A knurled knob 125 is mounted on the end of the screw member 124 for rotating the latter. The screw member 124 extends through, or is arranged in engagement with a nut 127, and the nut 127 is pivotally connected to a frame 128 by pins 129, Figure 12. The frame 128 is connected to the base 112 by a suitable pin or screw 130. Thus, when the screw member 124 is rotated by means of the knob 125, the arcuate shape of the tongues and trackways will cause the table tops 116 to tilt or move into and out of the broken line position shown in Figure 12.

The base 112 is normally maintained immobile in the trackway 111, Figure 13, by spring-pressed plungers 131. Thus, a pair of housings 132 are mounted in the shelves 109, and a plunger 131 is slidably arranged in each of the housings 132. A spring 133 normally urges the plunger 131 into engagement with the adjacent side of the base 112, whereby accidental movement of the base 112 is prevented. However, the springs 133 are sufficiently resilient so that when pressure is applied to the base 112, it will move in the trackway 111. For causing sliding movement of the base 112, a screw member 134 extends through a bracket 137 which is secured to the shelf 109. A pair of knobs 135 and 136 are mounted on the ends of the screw member 134, and the screw member 134 threadedly engages the side walls 114 which project upwardly from the base 112. Thus, by rotating either the knob 135 or the knob 136, the base 112 moves in the trackway 111, so that the table tops 116 can be moved toward and away from each other, there being two of the table tops 116.

The apparatus of the present invention further comprises a mechanism that includes a combination tracing instrument and light source, this mechanism being indicated generally by the numeral 138, Figures 5, 6, 7, 8 and 9. This mechanism includes a horizontally disposed tray 139 that is rotatably or movably supported on ball bearings 140', whereby the tray 139 can be moved to any desired location. Projecting upwardly from the tray 139 is a pair of spaced, parallel, vertically disposed uprights 140. One of the uprights 140 is provided with a scale or indicia 141 thereon, Figure 5, so that the user will be able to determine the correct elevation for the light source. Arranged between the pair of uprights 140 and extending upwardly from the tray 139 is a threaded shaft or screw member 142, Figure 8. A horizontally disposed ledge 143 is movably or adjustably connected to the screw member 142, and the ledge 143 is provided with a shoulder 144 which threadedly engages the screw member 142. The screw member 142 is provided with a knurled knob 145 whereby the screw member 142 can be rotated in order to raise or lower the ledge 143. A bearing assembly 146 is arranged in the lower end of the screw member 142, whereby the screw member is rotatably connected to the tray 139. A horizontally disposed plate 147 extends across the upper ends of the uprights 140 and screw member 142, and is connected thereto. A clamp 148, Figure 7, is supported on the plate 147, and the clamp 148 carries a set screw 149 which can be tightened or loosened in order to hold the screw member 142 immobile in its various adjusted positions. Supported on the ledge 143 and secured thereto in any suitable manner is a housing 150, there being a light bulb 151 arranged in the housing 150. The light bulb 151 is adapted to be connected to a suitable source of electrical energy by means of wires 152, Figure 8.

The light from the bulb 151 is emitted through or passes through an aperture 153 which is arranged in the top of the housing 150, and the aperture 153 registers with an aperture 154 which is formed or arranged in a disc 155. The disc 155 serves to prevent the user from being distracted by the parts therebelow. A suitable prism 156 is also supported on the ledge 143, and by looking through the prism or magnifying glass 156, the user will be able to readily observe the markings on the scale 141 so that the user will know when the light source is located at the proper elevation.

The tracing instrument which is carried by the tray 139 includes a pencil 157 which is provided with a point 158 for marking contours or other lines on the map being made. The pencil 157 further includes an upwardly extending stem 159 that has a collar 160 secured thereto, Figure 8. A finger 161 has one of its bifurcated ends arranged in engagement with the bottom of the collar 160, and the finger 161 is pivotally connected to an ear 162 by a pin 163. The other end of the finger 161 is adapted to be engaged in a spring member 164, the spring member 164 being secured to the tray 139 and serving to maintain the pencil immobile in its various positions. A U-shaped plate 165 is secured to the tray 139 by suitable screws 166, Figure 9, and a supporting member 167 which carries the pencil 157 is positioned between the legs of the plate 165. Suitable set screws 168 are projected through the legs of the plate 165 into engagement with the support member 167, whereby the pencil 157 can be further adjusted as desired. By exerting a downwardly directed pressure on the top of the stem 159, a mark can be made by the pencil point 158 on the map being made.

In use, referring to Figure 1, a suitable pair of aerial photographs are supported on the table tops 116. Then, the leg assemblies 43 are adjusted to the proper elevation, and the table tops 116 are adjusted as previously described. Next, the eye piece mirrors 68, which are both transparent and are good reflectors, are adjusted, and the mirrors 64 are adjusted. Then, the mechanism 138 is moved on the ball bearings to the proper position on the map to be made, and the light bulb 151 is energized. The scale 141 enables the user to ascertain when the light bulb 151 is at the proper elevation. Next, the user positions himself so that his pair of eyes E look down through the eye piece mirrors 68, as shown in Figure 1. The light shines up through the registering 153 and 154 and the light travels the paths indicated by broken lines in Figure 1. The mirrors 68 serve to reflect part of the light onto and from the mirrors 64, and when the proper position is determined, the stem 159 is manually depressed to thereby cause the point 158 to make a mark on the map being made.

From the foregoing, it is apparent that an apparatus or machine has been provided wherein a person can view one photograph of a stereoscopic pair of photographs of an area and object with one eye and also view the other photograph of the stereoscopic pair of photographs with the other eye. All adjustments can be made so as to provide a parallax free virtual stereoscopic model of the area or object in the same perspective position as the actual area and object. The light or dot will appear to float in the virtual model, and it can be set at a given height with respect to the model and made to trace a contour line (line of equal elevation). Or, the light or dot can be varied in height with respect to the virtual stereo model to appear at the surface of the model while traversing planimetric features, such as roads, creeks and the like. The apparatus of the present invention is constructed so that a small light or dot appears suspended within a virtual stereoscopic model, so that contour maps can be made from aerial photographs. When making a map, aerial photographs having not less than 40% overlap with a scale distance between photo centers or the principal points of each photo not to exceed the average interpupillary distance, which is the distance between a person's eyes, and flown at an altitude suitable for the contour map scale and accuracy desired. The aerial photographs are placed so that they will appear as one picture when viewed with a stereoscope. The model appears to be below or back of the eye piece mirrors 68 and is imaginary, because the light forming this model is reflected from the pictures on the table tops 116. However, the pin point light or dot emitted from the light bulb 151 is not imaginary, in that it is actually below or back of the eye piece mirrors 68. The eye piece mirrors 68 are different from most mirrors, in that they are good reflectors and are also transparent. The degree of reflection and transparency depends on the relative intensity of the reflected light from the aerial photographs to the light coming from the bulb 151. The light from the bulb 151 is subdued, and therefore a good, clear, virtual model is formed, but the light shining through the apertures 153 and 154 is clear and appears to float within the virtual model. By means of the previously-described adjustments, a true shape or parallax free and controlled model as to scale and relative position to the datum plane is provided. The mirrors 64 can be columnated, as previously described, and by alternately closing each eye and viewing the dot at the respective corner positions, the dot should remain over the same respective image point of each photo. If not, the adjustments of the table tops 116 and the eye piece mirrors 68 are used to tip the aerial photos or adjust them for size until the dot coincides with the same image point of the photo when the eyes are alternately opened and closed. When this is obtained, the stereo model is in adjustment for parallax, but it may not be in adjustment as to scale or level with the datum plane of the tracing light or dot. This latter adjustment is obtained by tipping the entire instrument by the adjustment of the leg assemblies 43. This matter adjustment requires at least three survey points of known elevation and position.

I claim:

1. In an apparatus for making maps from aerial photographs, a horizontally disposed table including a web and a pair of spaced parallel arms, a plurality of vertically disposed spaced parallel leg assemblies for supporting said table, each of said leg assemblies comprising a hollow sleeve having its upper end secured to said table, a bushing adjustably mounted in each sleeve and provided with a threaded socket, a threaded stem arranged in engagement with said socket and having a foot on its lower end, a knurled knob secured to said stem adjacent its lower end, a pair of spaced parallel vertically disposed standards projecting upwardly from said web and secured thereto, a clamp mounted at the upper end of said standard, a pair of spaced parallel horizontally disposed bars supported by said clamp, a pair of spaced brackets mounted on said bars, a horizontally disposed post having a threaded end arranged in engagement with each of said brackets and projecting forwardly therefrom, a plate connected to each of said posts, a stereoscopic mirror spaced from said plate and adjustably connected thereto, a stub shaft having a threaded end arranged in engagement with said clamp and projecting therefrom, a vertically disposed body member secured to said stub shaft and provided with a cutout defining a trackway, a first, second and third block slidably arranged in said trackway, said first, second and third blocks being arranged for longitudinal movement along said trackway, a body piece connected to each of said first and third blocks, a support piece connected to said body piece, a mirror-holding piece connected to said support piece, and a transparent eye piece mirror carried by each mirror-holding piece, manually operable means for shifting said eyepiece mirrors, and a table assembly supported on each of said arms.

2. The apparatus as described in claim 1, wherein said table assembly comprises a horizontally disposed rectangular shelf connected to said arm and provided with a trackway, a base slidably arranged in said trackway, manually operable screw members for causing movement of said base in said trackway, and means for causing the table tops on the table assembly to tilt.

3. In an apparatus for making maps from aerial photographs, a table including a web and a pair of spaced arms, a plurality of leg assemblies for supporting said table, each of said leg assemblies comprising a hollow sleeve having its upper end secured to said table, a bushing adjustably mounted in each sleeve and provided with a socket, a stem arranged in engagement with said socket and having a foot on its lower end, a knurled knob secured to said stem adjacent its lower end, a pair of standards projecting upwardly from said web and secured thereto, a clamp mounted at the upper end of said standard, a pair of bars supported by said clamp, a pair of spaced brackets mounted on said bars, a post having an end arranged in engagement with each of said brackets and projecting forwardly therefrom, a plate connected to each of said posts, a body mirror spaced from said plate and adjustably connected thereto, a stub shaft having an end arranged in engagement with said clamp and projecting therefrom, a body member secured to said stub shaft and provided with a cut-out defining a trackway, a first, second and third block slidably arranged in said trackway, said first, second and third blocks being arranged for longitudinal movement along said trackway, a body piece connected to each of said first and third blocks, a support piece connected to said body piece, a mirror holding piece connected to said body piece, and a transparent eye piece mirror carried by each mirror holding piece, manually operable means for shifting said eye piece mirrors, and a table assembly supported on each of said arms.

NORMAN B. PLATT.

References Cited in the file of this patent

UNITED STATES PATENTS

| Number | Name | Date |
|---|---|---|
| 1,985,066 | Von Gruber | Dec. 18, 1934 |
| 1,999,236 | Hess | Apr. 30, 1935 |
| 2,057,921 | Santoni | Oct. 20, 1936 |
| 2,263,971 | King et al. | Nov. 25, 1941 |
| 2,363,643 | Cook | Nov. 28, 1944 |
| 2,451,031 | Kelsh | Oct. 12, 1948 |
| 2,481,246 | Schlatter | Sept. 6, 1949 |
| 2,555,106 | Beazley | May 29, 1951 |